United States Patent [19]
Wani

[11] Patent Number: 5,577,098
[45] Date of Patent: Nov. 19, 1996

[54] DATA TRANSMISSION SYSTEM AND METHOD HAVING IMPROVED ALARM INHIBITING FUNCTION

[75] Inventor: Kazuo Wani, Kanagawa, Japan

[73] Assignee: Fujitsu Limited, Kanagawa, Japan

[21] Appl. No.: 297,613

[22] Filed: Aug. 29, 1994

[30] Foreign Application Priority Data

Mar. 15, 1994 [JP] Japan .................................. 6-043614

[51] Int. Cl.⁶ .......................... H04M 1/24; H04M 3/08; H04M 3/22
[52] U.S. Cl. ........................ 379/5; 379/1; 379/2; 379/10; 379/27; 379/29; 379/32; 379/33; 379/34
[58] Field of Search .................... 379/1, 2, 5, 32–34, 379/10, 27, 29, 46–48, 93

[56] References Cited

U.S. PATENT DOCUMENTS

| | | | |
|---|---|---|---|
| 4,815,120 | 3/1989 | Kosich | 379/34 |
| 4,819,261 | 4/1989 | Takeda | 379/27 |
| 4,864,598 | 9/1989 | Lynch | 379/32 |
| 4,969,178 | 11/1990 | Chen | 379/33 |
| 4,996,703 | 2/1991 | Gray | 379/46 |
| 5,029,290 | 7/1991 | Parsons | 379/48 |
| 5,063,563 | 11/1991 | Ikeda | 379/32 |
| 5,222,119 | 6/1993 | Asano | 379/29 |
| 5,241,579 | 8/1993 | Kim | 379/33 |
| 5,365,568 | 11/1994 | Gilbert | 379/47 |

*Primary Examiner*—Wellington Chin
*Assistant Examiner*—Vijay Shankar

[57] ABSTRACT

A first terminating unit terminates a subscriber line at a first end of the line, the first terminating unit being connected to a public telecommunication network. A second terminating unit terminates the subscriber line at a second end of the line, a terminal equipment being connected to the second terminating unit. A monitoring device monitors at least the subscriber line and the second terminating unit and an alarm generating unit generates an alarm input concerning a condition of at least the subscriber line and the second terminating unit. An alarm controlling device examines a result of the monitoring by the monitoring device, the alarm controlling device controlling, according to a result of the examination, how the alarm input generated by the alarm generating unit is handled. A loop establishing device establishes a loop circuit in the subscriber line, and the monitoring device includes, a loop-current detecting device for detecting an electric current, the electric current flowing through the subscriber line if the loop circuit has been established. A terminal-equipment monitoring device detects whether or not the terminal equipment is being used, the loop establishing device establishing the loop circuit if the terminal-equipment monitoring device detects that the terminal equipment is being used.

26 Claims, 7 Drawing Sheets

FIG.3

| CONDITION | ALARM CONTROL |
|---|---|
| POWER-SUPPLY CURRENT IS DETECTED | ALLOWING |
| POWER-SUPPLY CURRENT IS NOT DETECTED | INHIBITING |

FIG.5

| CONDITION | ALARM CONTROL |
|---|---|
| POWER-SUPPLY CURRENT IS DETECTED IN S-LINE | ALLOWING |
| POWER-SUPPLY CURRENT IS DETECTED IN R-LINE | INHIBITING |
| POWER-SUPPLY CURRENT IS DETECTED IN S-LINE AND THEN COMES NOT TO BE DETECTED | ALLOWING |
| POWER-SUPPLY CURRENT IS DETECTED IN R-LINE AND THEN COMES NOT TO BE DETECTED | INHIBITING |
| POWER SUPPLY CURRENT HAS BEEN DETECTED NEITHER IN S-LINE NOR IN R-LINE | INHIBITING |

FIG. 7

| CONDITION | ALARM CONTROL |
|---|---|
| POWER-SUPPLY CURRENT AND TE SYNC SIGNAL ARE DETECTED | ALLOWING |
| POWER-SUPPLY CURRENT IS DETECTED BUT TE SYNC SIGNAL IS NOT DETECTED | INHIBITING |
| TE SYNC SIGNAL IS DETECTED AND POWER-SUPPLY CURRENT COMES NOT TO BE DETECTED | ALLOWING |
| TE SYNC SIGNAL IS NOT DETECTED AND POWER-SUPPLY CURRENT COMES NOT TO BE DETECTED | INHIBITING |

DATA TRANSMISSION SYSTEM AND METHOD HAVING IMPROVED ALARM INHIBITING FUNCTION

BACKGROUND OF THE INVENTION

1. Field of the Invention

The present invention relates to a data transmission system and method, and in particular to a digital data transmission system and method for transmitting data between an intra-office subscriber line terminal equipment (the term 'subscriber line terminal equipment' is referred to as SLT, hereinafter) and a network channel terminating equipment (the term 'network channel terminating equipment' is referred to as NCTE, hereinafter) via a subscriber line. The SLT has a function to terminate the subscriber line connected to the NCTE. A first NCTE is provided in a subscriber's house and a first SLT is provided in a office of a vendor of a relevant public telecommunication network. The first SLT is coupled to a second SLT via the public telecommunication network, the second SLT being connected to a second NCTE, so that a first subscriber can communicate data to a second subscriber via the first NCTE, first SLT, public telecommunication network, second SLT and second NCTE.

In general, a subscriber's terminal equipment, for example, a cash dispenser in a bank, is connected with a NCTE, a subscriber, a customer of the bank in the example, directly communicating with the terminal equipment so as to input information to/take information from the NCTE. The NCTE has a function to convert signals coming from the terminal equipment into those desired by a relevant public telecommunication network. In the example of the bank, the NCTE is coupled with a host computer provided in a head office of the bank via the public telecommunication network.

Such digital data transmission systems using NCTEs have been used by various types of users and thus it has been demanded that various data transfer rates be applied in the transmission systems. Accordingly, it is necessary that NCTEs acting as a part of the transmission systems satisfy such users' demands. Further, interfaces for subscriber lines have been standardized. Thus, users have been able to prepare NCTEs freely without directly asking a vendor of a relevant telecommunication network, although previously subscribers always needed to either borrow or buy NCTEs from such a vendor in a conventional way. However, if it is assumed that a subscriber line is initially established between a subscriber's house and a vendor's office, a relevant vendor first prepares a vendor's NCTE so as to carry out tests to confirm establishment of the subscriber line.

After the tests, the subscriber may remove the vendor's NCTE from the subscriber line or switch off the power of the NCTE without informing the vendor of the removal or power switching off so as to connect another NCTE prepared by the subscriber. An SLT such as that described above provided in an office of a vendor has, in general, a function of issuing an alarm to a managing operator present in the office as a result of the SLT detecting troubles occurring along a subscriber line connecting the SLT with a relevant NCTE. Therefore, if the subscriber removes the vendor's NCTE from the subscriber line or switches off the NCTE's power as mentioned above, since the removal or power switching off results in disconnection of a circuit relevant to the subscriber line or lack of a normal response from the NCTE, an SLT terminating the subscriber line in a vendor's office detects the disconnection of the circuit or the lack of a normal response and thus issues an alarm to the managing operator present in the vendor's office. However, the alarm is not an alarm resulting from an actual trouble which the managing operator must handle but an alarm resulting from the subscriber's arbitrary behavior which is to be handled only by the subscriber itself. Such a kind of alarm is troublesome for the managing operator since the managing operator cannot find out whether the alarm is an alarm which must be handled by the operator or an alarm that does not have to be handled by the operator unless the operator directly communicates with the subscriber to inquire whether the subscriber has removed the NCTE from the subscriber line or switched off the power of the NCTE.

2. Prior Art

In order to prevent such a troublesome an alarm from being issued, the managing operator checks beforehand a condition regarding the NCTE currently connected to the subscriber line so that the operator may switch off the power of an equipment for performing the alarm issuing function in advance if it is found that the subscriber plans to remove the NCTE from the subscriber line or switch off the power of the NCTE. Thus, issuing an alarm is inhibited. Then, after the operator has confirmed that the subscriber has completed replacement of the originally connected NCTE with another NCTE, the operator switches on the power of the equipment for performing the alarm issuing function.

However, such a method by which the operator must switch off/on the equipment for issuing the alarm after the operator finds out that the subscriber's arbitrary behavior has affected the NCTE's connection with the subscriber line is still troublesome for the operator. Further, if the operator erroneously omits to switch off the power of the alarm equipment, the above troublesome alarm is issued. On the other hand, if the operator erroneously omits to switch on the power of the alarm equipment, any actual troubles do not actuate the alarm equipment to issue an alarm, so that the subscriber may be inconvenienced by these troubles.

SUMMARY OF THE INVENTION

An object of the present invention is to provide a data transmission system and method capable of automatically recognizing a condition regarding an NCTE so as to determine whether alarm is the sort of alarm which must be handled by an operator or another sort to alarm which can be ignored by the operator, so that reliable services regarding subscriber lines can be provided for subscribers.

In order to achieve the above object of the present invention, in the data transmission system and method according to the present invention, means for automatically recognizing a condition regarding an NCTE appropriately and means for either automatically inhibiting issuing an alarm or automatically allowing an alarm to be issued are provided in a relevant SLT. Whether the means inhibits or allows issuing an alarm depends on the condition regarding the NCTE. The condition regarding the NCTE may be concerned with whether or not a power-supply electric current is flowing in a relevant subscriber line. Such a method to recognize the condition regarding NCTE can be used on an assumption that troubles such as line-disconnection trouble do not occur in the subscriber line. It is determined that the presence of the power-supply electric current in the subscriber line indicates that the subscriber line continues normally to form a loop. Based on this assumption, it is determined that a condition where no power-supply electric current flows in the subscriber line indicates that the NCTE has been removed from the subscriber line or the power of the NCTE has been switched off by the subscriber. On the other hand, upon it being determined that the power-supply electric current flows in the subscriber line, the SLT is allowed to issue an alarm. Issuing of an alarm is thus allowed and the alarm issuing of which can allowed is a sort of an alarm issued due to some actual functional troubles such as a synchronization failure between the NCTE and SLT or the like, the synchronization failure having been detected by the SLT checking a synchronizing signal sent from the NCTE.

The condition regarding the NCTE may instead be concerned with whether or not a subscriber's terminal equipment connected to the NCTE is being used. If so, it is assumed that the subscriber has not removed the NCTE from the subscriber line or switched off the power of the NCTE before removing the subscriber's terminal equipment from the NCTE or switching off the power of the subscriber's terminal equipment. Whether the subscriber's terminal equipment is being used may be determined by finding out whether or not synchronization has been established between the subscriber's terminal equipment and NCTE. Whether or not synchronization has been established between the subscriber's terminal equipment and NCTE may be detected by the SLT in the following way: The NCTE functions to allow the power-supply electric current to flow in a first line of a data sending line and data receiving line of the subscriber line after synchronization has been established between the subscriber's terminal equipment and NCTE, and functions to allow the power-supply electric current to flow in a second line of a data sending line and data receiving line of the subscriber line if synchronization has not been established between the subscriber's terminal equipment and NCTE.

Thus, whether or not synchronization has been established between the subscriber's terminal equipment and NCTE may be detected by the SLT detecting whether the first line or second line has the power-supply electric current therein. If a power-supply electric current has been detected in neither the first nor the second line since the SLT was first set at the office so as to terminate the subscriber line, issuing of an alarm is inhibited. This is because such a condition indicates that the subscriber line has never been used, that is, the subscriber line is still in the process of being established. Therefore if no power-supply electric current is detected in the subscriber line, this is not a trouble but a normal state during a process to initially establish the subscriber line.

After a condition where the power-supply electric current is detected in the above first line and then the power-supply electric current comes not to be detected in the first line and also the power-supply electric current is not detected in the second line, an alarm is issued. After the subscriber's terminal equipment is removed from the NCTE or NCTE's power is switched off, no synchronization can be established between the subscriber's terminal equipment and the NCTE. As a result, as mentioned above, the NCTE allows the power-supply electric current to flow in the second line. That is, either the presence of the power-supply electric current in the first line or the absence of it in the second line indicates that the subscriber's terminal equipment is being used. Thus, the condition where the power-supply electric current is detected in neither the first nor the second line is determined to indicate that either the subscriber line or the NCTE has a trouble, the trouble inhibiting the function allowing the power-supply electric current to flow.

Alternatively, whether or not synchronization has been established between the subscriber's terminal equipment and NCTE may be detected by the SLT in the following method: The NCTE functions to send a signal indicating whether or not synchronization has been established between the subscriber's terminal equipment and NCTE. If the above signal indicates that synchronization has been established between the subscriber's terminal equipment and NCTE and then the power-supply electric current is not detected in the subscriber line, an alarm is issued. The condition where the synchronization establishment is detected and the power-supply electric current is not detected is determined to indicate that the subscriber's terminal equipment is being used and the power-supply electric current is absent, thus indicating that either the subscriber line or the NCTE has a trouble, the trouble inhibiting the function allowing the power-supply electric current to flow.

Other objects and further features of the present invention will become more apparent from the following detailed description when read in conjunction with the accompanying drawings.

BRIEF DESCRIPTION OF THE DRAWINGS

FIG. 3 illustrates a manner of allowing/inhibiting issuing of an alarm in the system shown in FIG. 2;

FIG. 5 illustrates a manner of allowing/inhibiting issuing of an alarm in the system shown in FIG. 4;

FIG. 7 illustrates a manner of allowing/inhibiting issuing of an alarm in the system shown in FIG. 6.

DESCRIPTION OF THE PREFERRED EMBODIMENTS

Figure 1:
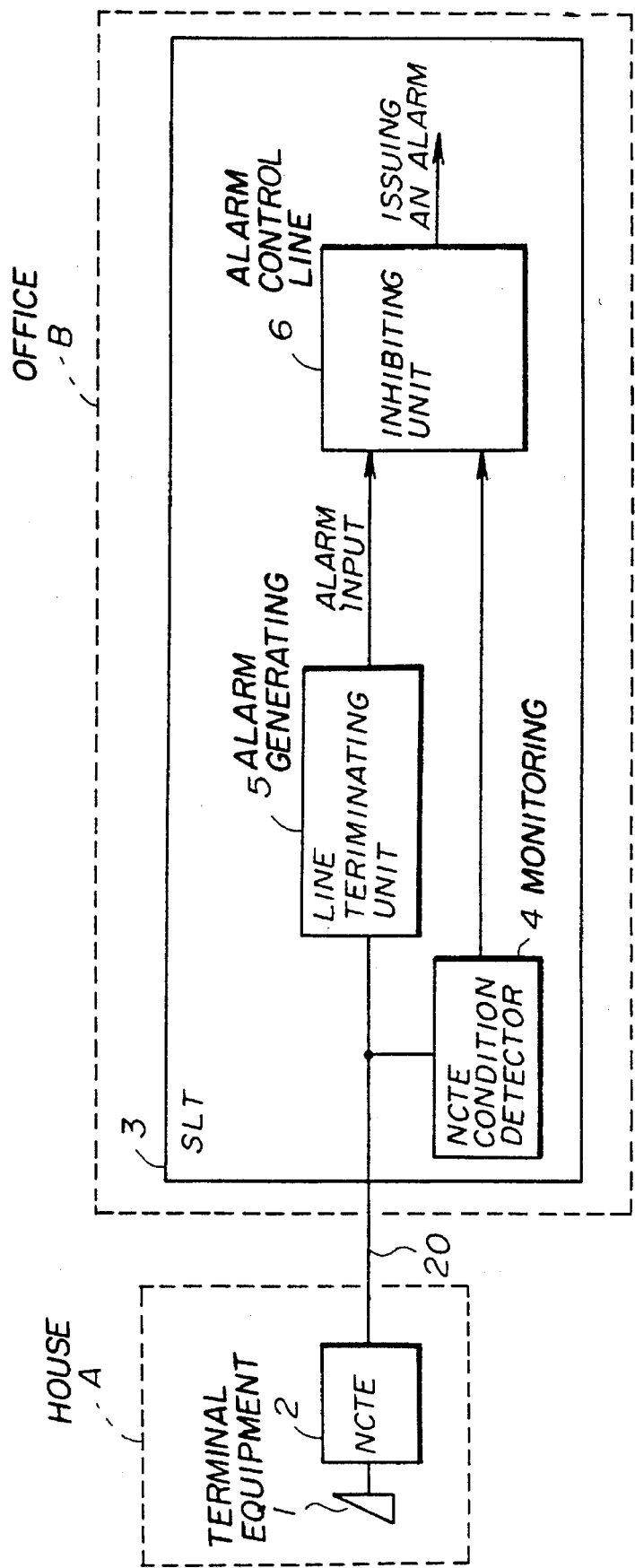
FIG. 1 shows a block diagram of a data transmission system in a first embodiment of a data transmission system and method according to the present invention.

With reference to FIG. 1, a digital data transmission system in a first embodiment of a data transmission system and method according to the present invention will be now described. This description is also applicable as a general description of data transmission systems in second, third and fourth embodiments of a data transmission system and method according to the present invention which will be described later.

The system shown in FIG. 1 includes an NCTE 2 provided in a subscriber's house A and an SLT 3 provided in a vendor's office B, a subscriber line 20 connecting the NCTE 2 with the SLT 3. A subscriber's terminal equipment 1 is coupled with the NCTE 2, a subscriber providing the NCTE 2 and the subscriber's terminal equipment (the term 'subscriber's terminal equipment' being referred to as TE, hereinafter).

The SLT 3 has a function to terminate a plurality of subscriber lines, the SLT 3 including an NCTE condition detecting unit 4 for detecting a condition of the NCTE 2, a line terminating unit 5 for terminating the subscriber line 20 and an inhibiting unit 6 for appropriately preventing an alarm from being issued in accordance with the condition of the NCTE 2. It is assumed that the subscriber line 20 previously connected with the SLT 3 has been newly established using, instead of the permanent NCTE 2, a temporary NCTE previously connected to the subscriber line 20 solely for the purpose of establishing the subscriber-line. In such a case, the subscriber may switch off the power of the temporary NCTE and remove it from the subscriber line 20. The power switching off and removal of the temporary NCTE prevents a normally-responding signal from being sent from the NCTE to the line terminating unit 5. The line terminating unit 5 thus determines that a trouble has occurred along the subscriber line 20 and thus supplies an alarm input to the inhibiting unit 6. Further, the NCTE condition detecting unit 4 detects the power switching off and removal of the temporary NCTE. The NCTE condition detecting unit 4 as a result sends an inhibiting signal to the inhibiting unit 6. Thus, the inhibiting unit 6 cancels the alarm input supplied by the line terminating unit 5, thus an preventing actual alarm from being issued. Thus, a managing operator present in the office B is not bothered by an alarm which does not have to be handled by the operator must handle.

The subscriber then couples the permanent NCTE 2 with the subscriber line 20 and the NCTE condition detection unit 4 then detects the coupling of the NCTE 2 with the subscriber line 20 and thus stops supplying the inhibiting signal to the inhibiting unit 6. Thus, the inhibiting unit 6 transmits any alarm input supplied by the line terminating unit 5. Thus, if an actual trouble such as the above-mentioned synchronization failure is detected by the line terminating unit 5 as described above and thus a relevant alarm is supplied by the unit 5 input to the inhibiting unit 6, the alarm input is transmitted by the inhibiting unit 6. As a result, the managing operator's attention in the office B is drawn to the actual trouble by a relevant actual alarm so that the operator can then handle the trouble.

Figure 2:
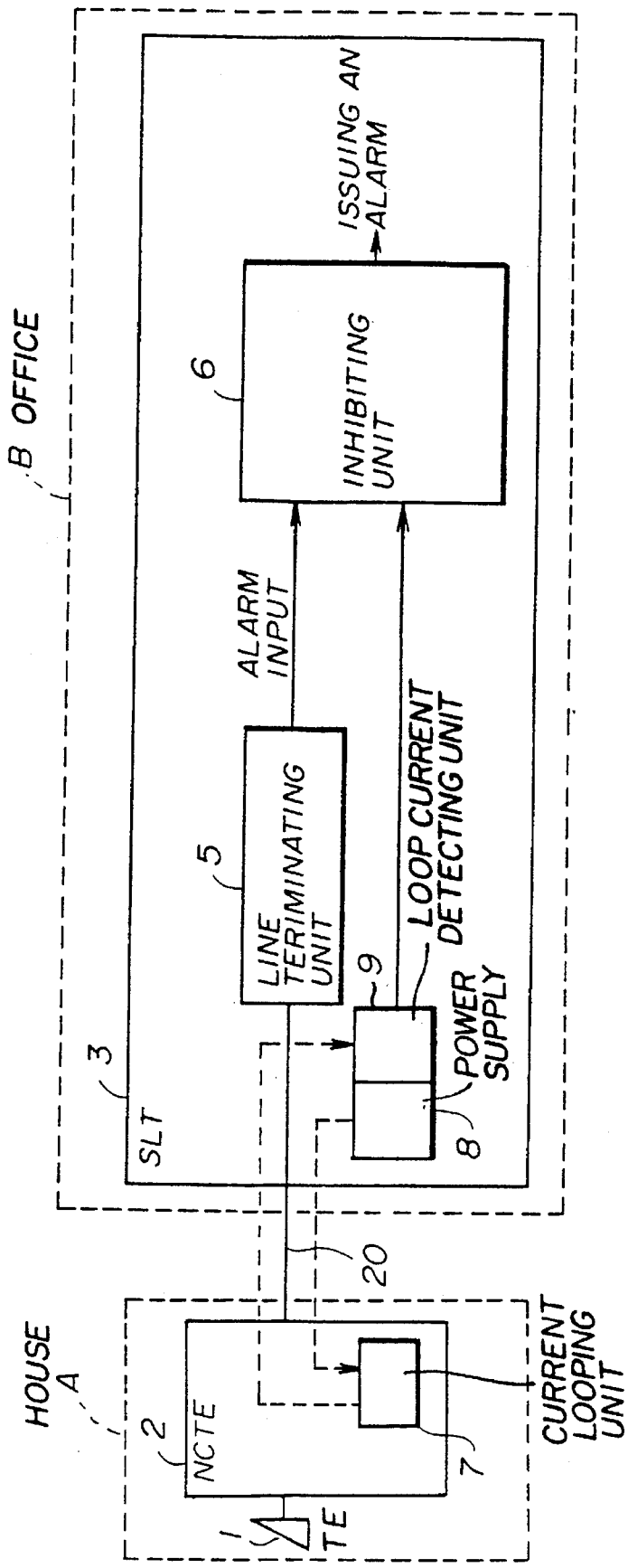
FIG. 2 shows a block diagram of a data transmission system in a second embodiment of a data transmission system and method according to the present invention.

With reference to FIGS. 2 and 3, a digital data transmission system in a second embodiment of a data transmission system and method according to the present invention will now be described. The system shown in FIG. 2 controls inhibiting/allowing of issuing alarms by detecting the presence of a power-supply electric current supplied from the SLT 3. Reference numerals the same as those given to the elements shown in FIG. 1 are given to elements shown in FIG. 2 corresponding to the relevant elements shown in FIG. 1. The NCTE 2 includes a power-supply electric-current looping unit 7 for establishing a power-supply loop, that is, a loop of a power-supply electric-current flowing circuit. The SLT 3 includes a power supply unit 8 for supplying the power-supply electric current flowing through the above-mentioned established power-supply loop. The SLT further includes a loop current detecting unit 9 for detecting the power-supply electric current flowing through the power-supply loop. The power-supply loop is formed by the subscriber line 20, the power-supply electric-current looping unit 7, the power supply unit 8 and the loop current detecting unit 9.

If the NCTE 2 is powered by a local power source such as a commercial power source, switching on the power of the NCTE 2 causes the looping unit 7 to establish the power-supply loop including the loop current detecting unit 9 and power supply unit 8. In this case, the power supply unit 8 for supplying the power-supply electric current flowing through the power-supply loop of the subscriber line 20 is provided particularly for detecting the switching on of the power of the NCTE 2. Switching off the power of the NCTE 2 causes the looping unit 7 to open the power-supply loop so as to cancel the establishment of the power-supply loop.

If the NCTE 2 is powered by a remote power source, that is, the power supply unit 8 powers the NCTE 2, coupling of the NCTE 2 with the subscriber line 20 causes the looping unit 7 to establishes the power-supply loop including the loop current detecting unit 9 and power supply unit 8. Removal of the NCTE 2 from the subscriber line 20 causes the looping unit 7 to open the power-supply loop so as to cancel the establishment of the power-supply loop.

The loop current detecting unit 9 detects the power-supply current flowing through the established power-supply loop. Thus, the loop current detecting unit 9 detects that the NCTE 2 has been coupled with the subscriber line 20 in the above case where the NCTE 2 is powered by the remote power source. In the other case where the NCTE 2 is powered by the local power source, the loop current detecting unit 9 detects that the power of the NCTE 2 coupled with the subscriber line 20 has been switched on.

The line terminating unit 5 supplies an alarm input to the inhibiting unit 6 if a trouble is detected as a result of the unit 5 checking a signal received via the subscriber line 20. The inhibiting unit 6 issues an alarm if the alarm input is supplied to it by the line terminating unit 5 under a condition where the loop current detecting unit 9 detects the power-supply electric current flowing through the established power-supply loop, the inhibiting unit 6 being informed of this detection by a relevant signal sent by the unit 9 to the inhibiting unit 6, as shown in FIG. 3. The inhibiting unit 6 does not issue an alarm if the alarm input is supplied by the line terminating unit 5 under a condition where the loop current detecting unit 9 does not detect the power-supply electric current flowing through the power-supply loop, the inhibiting unit 6 being informed of this non-detection by a relevant signal sent by the unit 9 to the inhibiting unit 6, as shown in the figure.

Either a known four-wire transmission method or a two-wire transmission method may be applied to the transmission system shown in FIG. 2. In the four-wire method, bidirectional signal transmission is performed via two different pairs of wires, while a time-division bidirectional transmission method enables a pair of wires to carry bidirectionally transmitted signals in the two-wire method. Whether such a four-wire transmission method is applied so that the subscriber line 20 has four wires or such a two-wire transmission method is applied so that the subscriber line 20 has two wires, a power-supply operation to supply the power-supply electric current flowing through the power-supply loop can be performed. Therefore, detecting of either the power of the NCTE 2 coupled with the subscriber line 20 being switched on or the NCTE 2 being coupled with the subscriber line 20 by detecting the power-supply electric current flowing through the power-supply loop can be performed as described above. As a result, the controlling of alarm issuing inhibition/allowance appropriately by means of the inhibiting unit 6 as described above can be carried out.

Figure 4:
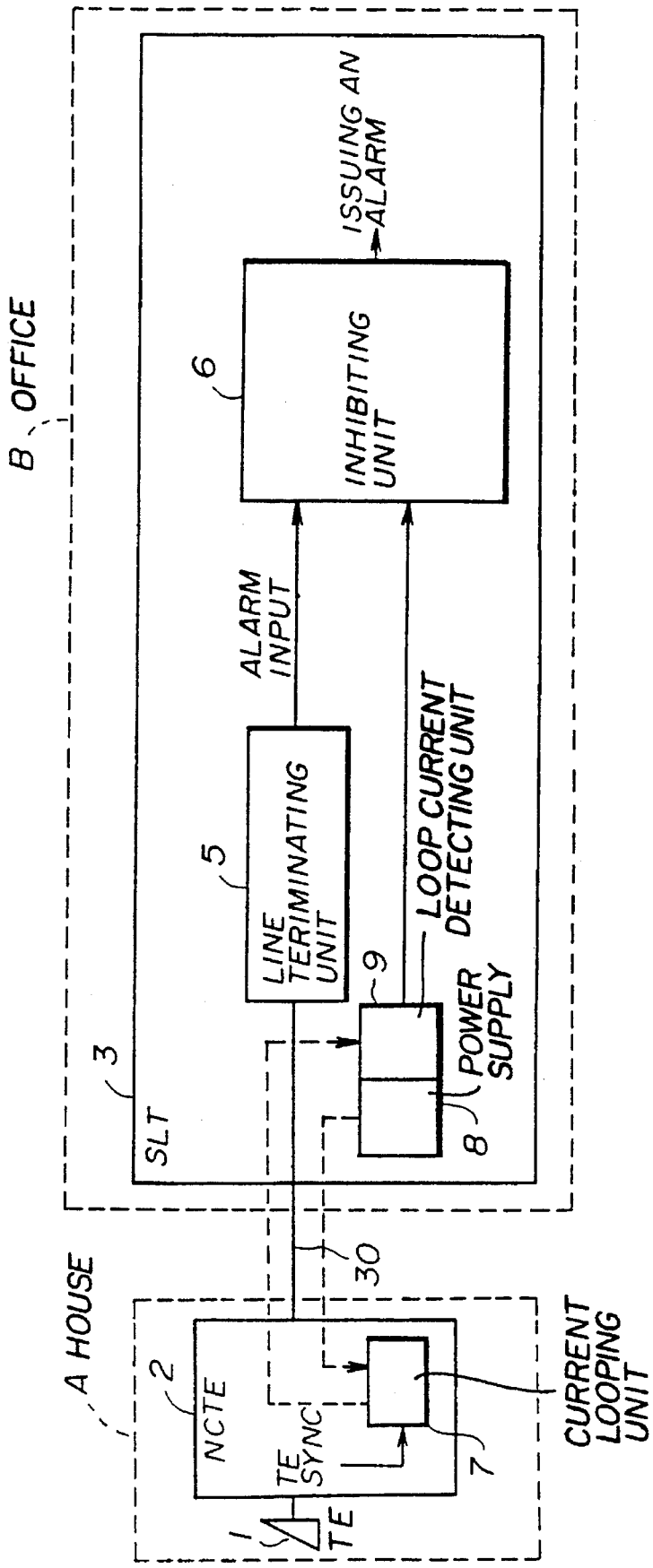
FIG. 4 shows a block diagram of a data transmission system in a third embodiment of a data transmission system and method according to the present invention.

With reference to FIGS. 4 and 5, a digital data transmission system in a third embodiment of a data transmission system and method according to the present invention will now be described. The system shown in FIG. 4 controls inhibiting/allowing of alarm issuing by detecting the presence of a power-supply electric current supplied from the SLT 3. Reference numerals the same as those of the elements shown in FIG. 2 are given to elements shown in FIG. 4 corresponding to the relevant elements shown in FIG. 2. The system shown in FIG. 4 uses a four-wire transmission system such as that described above. Thus, a subscriber line 30 has four wires, that is, two pairs of wires, a first pair of wires being a sending line (referred to as an S-line, hereinafter) for transmitting signals from the NCTE 2 to the SLT 3 and a second pair of wires being a receiving line (referred to as an R-line, hereinafter) for transmitting signals from the SLT 3 to the NCTE 2.

The system shown in FIG. 4 determines whether or not the power-supply electric current is detected in the S-line and whether or not the power-supply electric current is detected in the R-line to determine whether or not the TE 1 is being used in the subscriber's house A. Specifically, the system establishes the power-supply loop in the S-line if the NCTE 2 detects a terminal synchronization (referred to as TE SYNC, hereinafter) signal sent from the TE 1 through the power-supply electric-current looping unit 7. The system establishes the power-supply loop in the R-line if the NCTE 2 does not detect the TE SYNC signal sent from the TE 1 through the looping unit 7. The TE SYNC signal cannot be detected by the NCTE 2 in either of the following cases: after the TE 1 has been removed from the NCTE 2 or after the power of the TE 1 has been switched off. The SLT 3 determines that the TE 1 is being used if the SLT 3 detects the power-supply electric current in the S-line and determines that TE 1 is not being used if the SLT 3 detects the power-supply electric current in the R-line. The power-supply unit 8 supplies power to cause the power-supply electric current to flow either in the S-line or R-line.

Detection of the power-supply electric current in either the S-line or the R-line is performed by the loop current detecting unit 9 having functions of distinguishing between whether the power-supply electric current is detected in the S-line or the R-line. The inhibiting unit 6 issues an alarm if the alarm input is supplied by the line terminating unit 5 under a condition where the loop current detecting unit 9 detects the power-supply electric current flowing through the power-supply loop established in the S-line, the inhibiting unit 6 being informed of the detection by a relevant signal sent to the inhibiting unit 6, as shown in FIG. 5. The presence of the power-supply electric current in the S-line indicates that the TE 1 is being used. The inhibiting unit 6 does not issue an alarm even if the alarm input is supplied by the line terminating unit 5 under a condition where the loop current detecting unit 9 detects the power-supply electric current flowing through the power-supply loop in the R-line, the inhibiting unit 6 being informed of the detection by a relevant signal sent to the inhibiting unit 6, as shown in the figure. The presence of the power-supply electric current in the R-line indicates that the TE 1 is not being used.

Such operation flows are made based on an assumption that the subscriber in the house A has no intention of using the transmission system either if the TE 1 has been removed from the NCTE 2 or if the power of the TE 1 has been switched off. Therefore, in such a situation, it is not necessary to issue an alarm to the operator in the office B to handle a matter causing the alarm. This is because, in this third embodiment and also in a fourth embodiment which will be described later with reference to FIGS. 6 and 7, it is assumed that the subscriber is concerned about the TE 1 while it is assumed that the operator belonging to the vendor of the public telecommunication network is concerned about the NCTE 2, although previously the NCTE 2 had been prepared by the subscriber. There may be a case where the TE 1 has some trouble so it does not send the TE SYNC signal to the NCTE 2. Such a case is assumed to be one which must be handled by the subscriber and one which does not have to be handled by the operator belonging to the vendor since the case concerns a matter regarding the TE 1.

On the other hand, if the TE SYNC signal is detected in the NCTE 2, it is determined that the subscriber clearly intends to use the transmission system including the TE 1 and also that the TE 1 is in a normal state, that is, the TE 1 is determined to have no trouble. If, in such a situation, the line terminating unit 5 detects a trouble as a result of checking the signal sent from the NCTE 2 via the subscriber line 30, the trouble is determined to be a trouble occurring due to the vendor. That is, the trouble occurs as a result, for example, of a software program running in the NCTE 2 having a trouble. Therefore, the trouble is detected by the SLT which then issues an alarm so as to draw attention of the operator belonging to the vendor to the trouble so it can be appropriately handled.

Further, as described above, it is assumed that the subscriber has not removed the NCTE 2 from the subscriber line 30 or switch off the power of the NCTE 2, before removing the TE 1 from the NCTE 2 or switching off the power of the TE 1.

If the power-supply electric current has not been detected in either the S-line or the R-line in the detecting unit 9 since the SLT 3 was first set at the office B so as to terminate the subscriber line 30, the inhibiting unit 6 ignores all alarm input supplied by the line terminating unit 5. The ignoring of the alarm input by the inhibiting unit 6 results in no corresponding alarm being output from the SLT 3, in each of the embodiments shown in FIGS. 1, 2, 4 and 6. This is because this condition is determined to indicate that the subscriber line 30 has never been used, thus indicating either that the subscriber line 30 is still in the process of being established, or that no NCTE has been coupled to the subscriber line 30 since the SLT 3 was first set at the office B so as to terminate the subscriber line 30. Therefore, since it is impossible for an NCTE to send a normal response to the line terminating unit 5 via the subscriber line 30, the line terminating unit 5 supplies an alarm input to the inhibiting unit 6 although no actual trouble has occurred. Accordingly, it is proper for the inhibiting unit 6 to ignore an alarm input supplied from the line terminating unit 5 if the power-supply electric current has been detected neither in the S-line nor by the R-line in the detecting unit 9 since the SLT 3 was first set at the office B so as to terminate the subscriber line 30.

After a condition where the power-supply electric current is detected in the S-line by the detecting unit 9 and then the current comes not to be detected, the inhibiting unit 6 being informed of the detection and non-detection by a relevant signal sent to the inhibiting unit 6, the inhibiting unit 6 issues an alarm if alarm input is supplied to the unit 6 by the line terminating unit 5. This is because the above condition is determined to indicate that a trouble has occurred under a condition where the subscriber clearly intends to use the transmission system and therefore the TE 1 is normally coupled to the NCTE 2. Thus, a trouble is determined to have occurred in the NCTE 2 or in the subscriber line 30. If a trouble actually occurs in the NCTE 2 or in the subscriber line 30, the trouble should be detected by the line terminating unit 8 so as to supply a corresponding alarm input to the inhibiting unit 6, the inhibiting unit 6 thus issuing an alarm.

After a condition where the power-supply electric current is detected in the R-line by the detecting unit 9 then comes not to be detected, the inhibiting unit 6 being informed of the detection and non-detection by a relevant signal sent to the inhibiting unit 6, the inhibiting unit 6 continues to ignore all the alarm input supplied by the line terminating unit 5. This is because the above condition is determined to indicate that the NCTE 2 has been removed from the subscriber line 30 or the power of the NCTE 2 has been switched off after switching off the power of the TE 1 or removing the TE 1 from the NCTE 2. There may be a case where a trouble occurs in either the NCTE 2 or the subscriber line 30 under a condition where the power of the TE 1 was switched off or the TE 1 was removed from the NCTE 2. However, such a situation is rare since the condition under which the power of the TE 1 is switched off or the TE 1 is removed from the NCTE 2 is itself rare. Therefore, after a condition where the power-supply electric current is detected in the R-line by the detecting unit 9 and then the current comes not to be detected, it is not necessary to issue an alarm to the operator in the office B to handle a matter causing the alarm since the non-detection is determined to result from a matter concerning the TE 1.

In order to effectively use the above-described alarm-issuing inhibiting method, the vendor may instruct the subscriber as follows: If the subscriber plans to move the NCTE 2 for the purpose of changing of a location of the NCTE 2 in the house A so that a temporary removal of the NCTE 2 from the subscriber line 30 is needed, first the power of the TE 1 must be switched off, then the power of the NCTE 2 may be switched off so that the NCTE 2 may be removed from the subscriber line 30 without causing an alarm to be issued by the SLT 3. This is because such steps cause the power-supply electric current to flow in the R-line in response to the switching off of the power of the TE 1, thus causing the detected electric current not to be detected in response to the switching off of the power of the NCTE 2. These conditions cause the inhibiting unit 6 to continue to ignore all the alarm input supplied by the line terminating unit 5.

Figure 6:
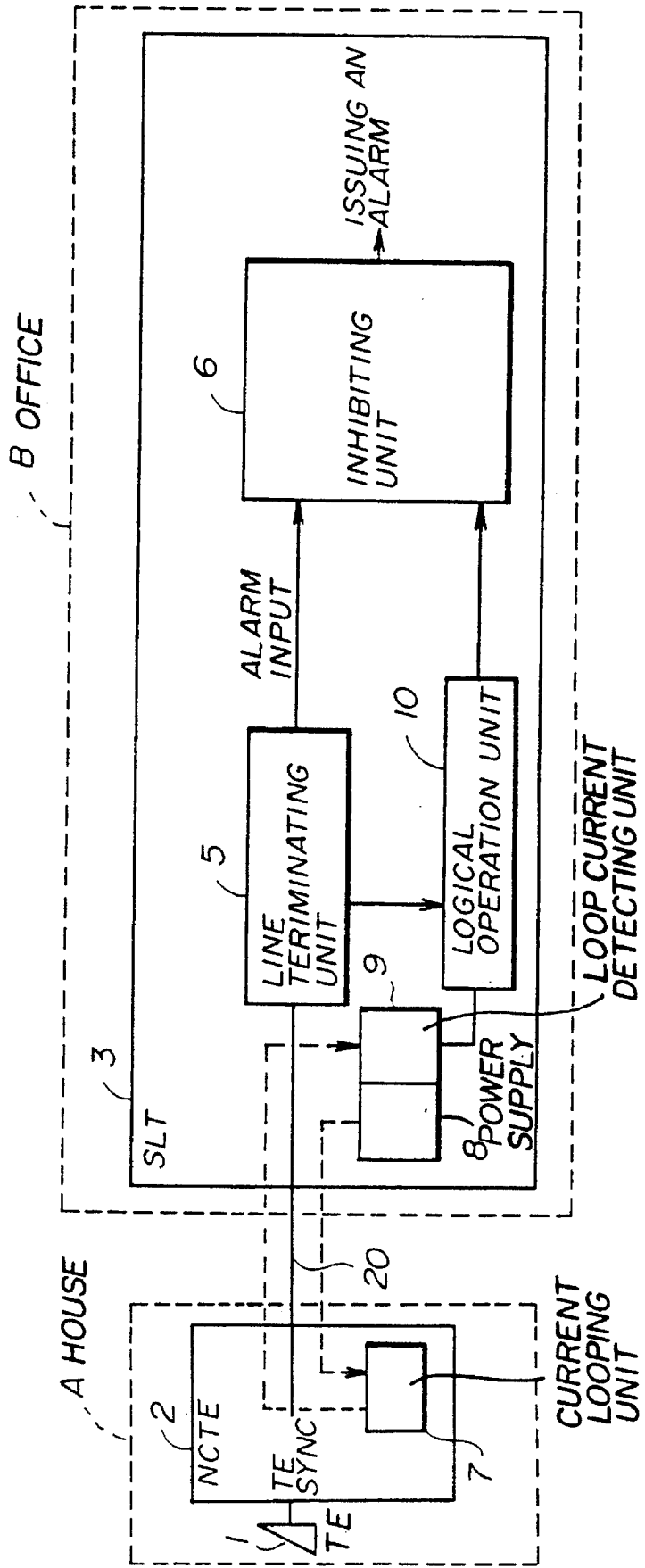
FIG. 6 shows a block diagram of a data transmission system in a fourth embodiment of a data transmission system and method according to the present invention.

With reference to FIGS. 6 and 7, a digital data transmission system in a fourth embodiment of a data transmission system and method according to the present invention will now be described. The system shown in FIG. 6 controls inhibiting/allowing of alarm issuing by detecting the presence of a power-supply electric current supplied from the SLT 3. Reference numerals the same as those of the elements shown in FIG. 2 are given to elements shown in FIG. 6 corresponding to the relevant elements shown in FIG. 2. The system shown in FIG. 4 has a function to allocate data serving as the above-described TE SYNC signal in a data frame carried by a signal from the NCTE 2 to the SLT 3 via the subscriber line 20. Thus, the SLT 3 can recognize whether the TE SYNCH signal is sent to the NCTE 2 from the TE 1 by checking the above-mentioned data carried by the signal sent to the SLT 3 from the NCTE 2. Thus, the method by which the SLT 3 recognizes whether or not the TE SYNC signal is sent to the NCTE 2 from the TE 1 used in the system shown in FIGS. 6 and 7 is different from the corresponding method used in the system shown in FIGS. 4 and 5. Except for this difference between the TE-SYNC recognizing methods and difference derived from this difference, the system shown in FIGS. 6 and 7 is substantially identical to the system shown in FIGS. 4 and 5.

In the system shown in FIG. 6, the NCTE 2 sends a TE SYNC signal to the SLT 3 if the TE 1 is being used and also synchronization has been established between the TE 1 and NCTE 2. The sent TE SYNC signal is received by the line terminating unit 5. A logical operation unit 10 coupled to the loop current detecting unit 9 performs a logical operation on a result of the loop-current detection by means of the detecting unit 9 and a result of the TE-SYNC signal detection by means of the line terminating unit 5. The logical operation unit 10 supplies a control signal to the inhibiting unit 6 according to the result of the above logical operation.

The logical operation unit 10 determines that the TE 1 is being used if the power-supply electric current is detected by means of the detecting unit 9 and the TE SYNC signal is detected by means of the line terminating unit 5. As a result, as shown in FIG. 7, the unit 10 supplies the control signal to the inhibiting unit 6, the control signal indicating relevant instructions to cause the inhibiting unit 6 to issue an alarm if any alarm signal is supplied by the line terminating unit 5. The logical operation unit 10 determines that either the TE 1 is not being used or the TE 1 has a trouble if no TE SYNC signal is detected by the detecting unit 9. Thus, as shown in FIG. 7, the logical operation unit 10 supplies the control signal indicating relevant instructions to cause the inhibiting unit 6 to ignore all the alarm signal input being supplied by the line terminating unit 5.

Further, the logical operation unit 10 determines that either the NCTE 2 has been removed from the subscriber line 20 or the power of the NCTE 2 has been switched off, each condition being determined to clearly result from the subscriber's intention, if no power-supply electric current is detected by the detecting unit 9. As a result, as shown in FIG. 7, the logical operation unit 10 supplies the control signal to the inhibiting unit 6 to cause the inhibiting unit 6 to ignore all the alarm signal input supplied by the line terminating unit 5. However, as shown in FIG. 7, the logical operation unit 10 determines oppositely after a condition where establishment of the synchronization is detected by detecting the TE SYNC signal and the power-supply electric current is detected and then the current comes not to be detected. That is, the logical operation unit 10 determines that either the NCTE 2 or the subscriber line 20 has a trouble although the TE 1 has is used. As a result, as shown in FIG. 7, the logical operation unit 10 supplies the control signal to the inhibiting unit 6 to cause the inhibiting unit 6 to issue an alarm if an alarm input is supplied by the line terminating unit 5. If either the NCTE 2 or the subscriber line 20 actually has a trouble, the trouble should be detected by the line terminating unit 8 so the unit 8 supplies corresponding alarm input to the inhibiting unit 6, the inhibiting unit 6 thus issuing an alarm. On the other hand, the logical operation unit 10, by sending the control signal indicating relevant instructions, causes the inhibiting unit 6 to continue to ignore all the alarm signal input supplied by the line terminating unit 5 after a condition where establishment of synchronization with the TE 1 is not detected and the power-supply electric current is detected and then the current comes not to be detected.

Similarly to the system shown in FIG. 4, in order to effectively use the above-described alarm issuing inhibiting method in the system shown in FIG. 6, the vendor may instruct the subscriber as follows: If the subscriber plans to move the NCTE 2 for the purpose of changing of a location of the NCTE 2 in the house A so that temporary removal of the NCTE 2 from the subscriber line 20 is needed, first the power of the TE 1 must be switched off, then the power of the NCTE 2 may be switched off so that the NCTE 2 may be removed from the subscriber line 30 without causing an alarm to be issued by the SLT 3. This is because such steps cause the TE SYNC signal not to be detected in response to the switching off of the power of the TE 1, thus causing the detected electric current not to be detected in response to the switching off of the power of the NCTE 2. These conditions cause the inhibiting unit 6 to continue to ignore all the alarm input supplied by the line terminating unit 5.

Further, the present invention is not limited to the above described embodiments, and variations and modifications may be made without departing from the scope of the present invention.

What is claimed is:

1. A data transmission system comprising:

a subscriber line;

a first terminating unit for terminating said subscriber line at a first end of said subscriber line, said first terminating unit being connected to a public telecommunication network;

a second terminating unit for terminating said subscriber line at a second end of said subscriber line, a terminal equipment being connected to said second terminating unit;

alarm generating means at said first end of said subscriber line for generating an alarm input indicative of a trouble condition of said subscriber line and said second terminating unit;

monitoring means for monitoring said subscriber line and said second terminating unit; and alarm controlling means, coupled to said alarm generating means and said monitoring means, for examining a result of monitoring by said monitoring means and for controlling whether or not said alarm input generated by said alarm generating means is canceled, according to a result of said examining.

2. The data transmission system according to claim 1, further comprising terminal-equipment monitoring means for detecting whether or not said terminal equipment is being used;

said alarm controlling means issuing an alarm if the alarm input is generated by said alarm generating means under a condition where said terminal-equipment monitoring means detects that said terminal equipment is being used.

3. The data transmission system according to claim 1, further comprising loop establishing means for establishing a loop circuit through said subscriber line and said second terminating unit;

and wherein said monitoring means comprises loop-current detecting means for detecting an electric current, said electric current flowing through said subscriber line after said loop circuit has been established.

4. The data transmission system according to claim 3, further comprising terminal-equipment monitoring means for detecting whether or not said terminal equipment is being used;

and wherein said loop establishing means establishes the loop circuit if said terminal-equipment monitoring means detects that said terminal equipment is being used.

5. The data transmission system according to claim 4, wherein if said terminal-equipment monitoring means detects that synchronization has been established between said second terminating unit and said terminal equipment, it is determined that said terminal equipment is being used, while if said terminal-equipment monitoring means does not detect that the synchronization has been established, it is determined that said terminal equipment is not being used.

6. The data transmission system according to claim 4, wherein said alarm controlling means issues an alarm if said alarm generating unit generates the alarm input after a condition where said loop-current detecting means detects the electric current flowing through said subscriber line and then the current comes not to be detected.

7. The data transmission system according to claim 4, wherein:

said subscriber line comprises a first line and a second line; and said loop establishing means establishes the loop circuit in said first line of said subscriber line if said terminal-equipment monitoring means detects that said terminal equipment is being used, said loop establishing means establishing the loop circuit in said second line of said subscriber line if said terminal-equipment monitoring means does not detect that said terminal equipment is being used.

8. The data transmission system according to claim 7, wherein said alarm controlling means does not issue an alarm even if said alarm generating means generates the alarm input under a condition where the loop-current has been detected flowing through neither said first line nor said second line since said first terminating unit was first set to terminate said subscriber line.

9. The data transmission system according to claim 3, further comprising synchronization-signal sending means for sending a synchronization signal after synchronization between said second terminating unit and said terminal equipment has been established; and said monitoring means further comprises synchronization detecting means for detecting that the synchronization has been established between said second terminating unit and said terminal equipment.

10. The data transmission system according to claim 9, wherein said alarm controlling means issues an alarm if said alarm generating means generates the alarm input under after said synchronization detecting means has detected the synchronization has been established between said second terminating unit and said terminal equipment and said loop-current detecting means does not detect the loop current flowing through said subscriber line.

11. A data transmission method comprising the steps of:

a) generating an alarm input indicative of a trouble condition of a subscriber line, terminated at one end by a first terminating unit and at the other end by a second terminating unit, and said second terminating unit;

connecting said first terminating unit with a public telecommunication network; and connecting said second terminating unit with a terminal equipment;

b) monitoring, at said first terminating unit, said subscriber line and said second terminating unit;

c) examining a result of said monitoring step b); and d) controlling, according to a result of said examining, issuance of said alarm input indicative of a trouble condition of said subscriber line and said second terminating unit.

12. The data transmission method according to claim 11, further comprising a step e) for detecting whether or not said terminal equipment is being used;

said step d) issuing said alarm input if the alarm input is generated in said step a) under a condition where said step e) detects that said terminal equipment is being used.

13. The data transmission method according to claim 11, further comprising a step f) for establishing a loop circuit in said subscriber line;

and wherein said step b) includes a step b-1) for detecting an electric current, said electric current flowing through said subscriber line after said loop circuit has been established.

14. The data transmission method according to claim 13, further comprising a step e) for detecting whether or not said terminal equipment is being used;

and wherein said step f) establishes the loop circuit if said step f) detects that said terminal equipment is being used.

15. The data transmission method according to claim 14, wherein if said step e) detects that synchronization has been established between said second terminating unit and said terminal equipment, it is determined that said terminal equipment is being used, while if said step e) does not detect that synchronization has been established between said second terminating unit and said terminal equipment, it is determined that said terminal equipment is not being used.

16. The data transmission method according to claim 14, wherein said step d) an alarm issues if said step a) generates the alarm input after a condition where said step b-1) detects the electric current flowing through said subscriber line and then the electric current can not be detected.

17. The data transmission method according to claim 14, wherein:

said subscriber line comprises a first line and a second line; and said step f) establishes the loop circuit in said first line of said subscriber line if said step e) detects that said terminal equipment is being used, said step f) establishing the loop circuit in said second line of said subscriber line if said step e) does not detect that said terminal equipment is being used.

18. The data transmission method according to claim 17, wherein said step d) does not issue an alarm even if said step a) generates the alarm input under a condition where the loop-current has been detected flowing through neither said first line nor said second line since said first terminating unit was first set to terminate said subscriber line.

19. The data transmission method according to claim 13, further comprising a step g) for sending a synchronization signal after synchronization between said second terminating unit and said terminal equipment has been established; and said step b) further comprises a step b-2) for detecting the synchronization established between said second terminating unit and said terminal equipment.

20. The data transmission method according to claim 19, wherein said step d) issues an alarm if said step a) generates the alarm input after a condition where said step b-2) has detected that the synchronization has been established between said second terminating unit and said terminal equipment and then said step b-1) does not detect the loop current flowing through said subscriber line.

21. The data transmission system according to claim 1, wherein said data transmission system comprises a digital data transmission system.

22. The data transmission system according to claim 1, wherein said first terminating unit comprises a subscriber line terminal equipment and said second terminating unit comprises a network channel terminating equipment.

23. The data transmission system according to claim 1, wherein said alarm controlling means inhibits issuing an alarm when said monitoring means has determined that said second terminating unit is not connected to said subscriber line even if said alarm generating means has generated an alarm input.

24. The data transmission method according to claim 11, applied to a digital data transmission system.

25. The data transmission method according to claim 11, wherein said first terminating unit comprises a subscriber line terminal equipment and said second terminating unit comprises a network channel terminating equipment.

26. The data transmission method according to claim 11, wherein said step d) inhibits issuing an alarm when said step c) has determined that said second terminating unit is not connected to said subscriber line even if said step a) has generated an alarm input.

* * * * *